Sept. 8, 1959 R. E. CARLSON 2,903,049
TRUCK WHEEL AND TIRE DISMOUNTER AND CHANGER
Filed Nov. 8, 1956 2 Sheets-Sheet 1
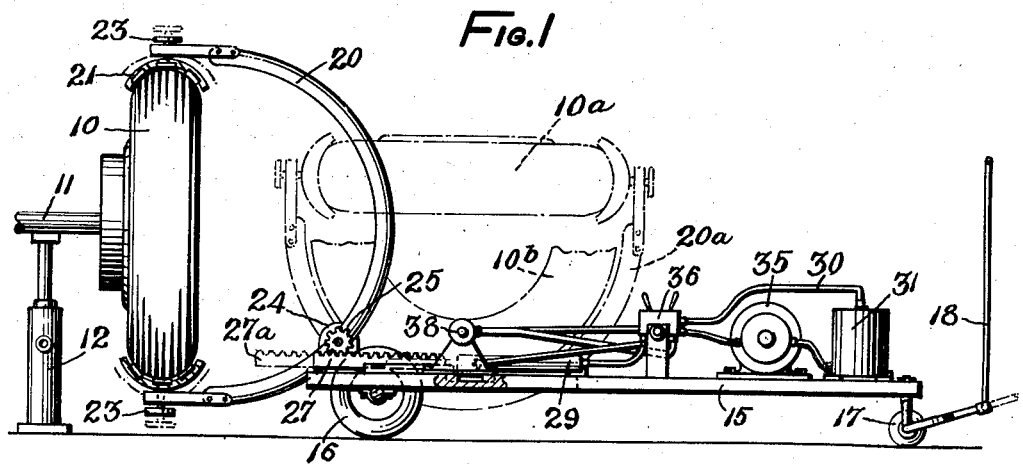
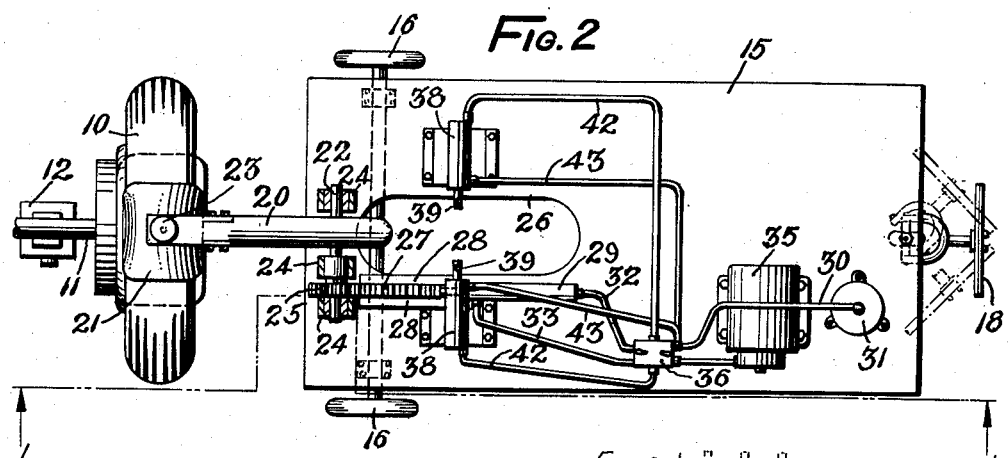
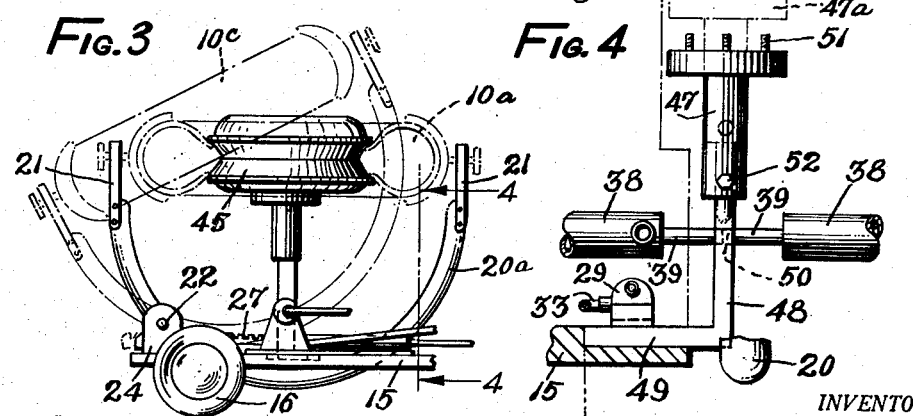
INVENTOR.
Raymond E. Carlson Sept. 8, 1959  R. E. CARLSON  2,903,049
TRUCK WHEEL AND TIRE DISMOUNTER AND CHANGER
Filed Nov. 8, 1956  2 Sheets-Sheet 2
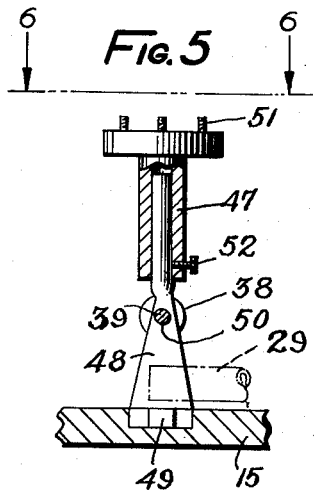
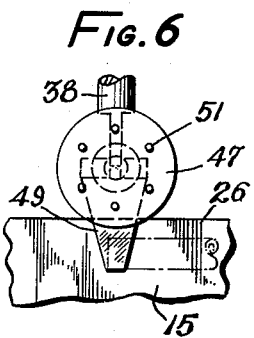
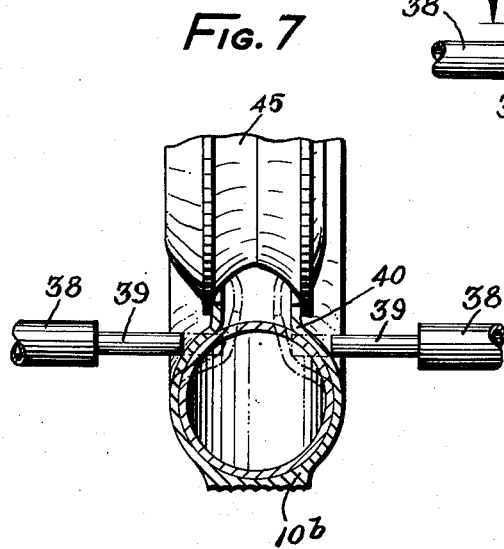
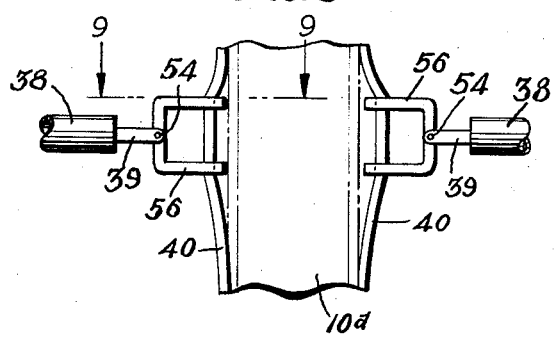
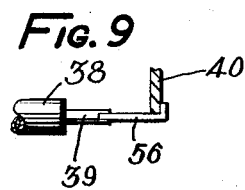
INVENTOR.
Raymond E. Carlson

United States Patent Office

2,903,049
Patented Sept. 8, 1959

2,903,049
TRUCK WHEEL AND TIRE DISMOUNTER AND CHANGER

Raymond E. Carlson, Glendive, Mont.

Application November 8, 1956, Serial No. 621,071

2 Claims. (Cl. 157—1)

This invention relates to dollies and, more particularly, to dollies for changing and transporting vehicle tire and wheel assemblies.

The wheels and tires of trucks, buses, and airplanes are usually quite heavy, making it substantially difficult to change and handle these assemblies by hand. Accordingly, an object of this invention is to provide a dolly for facilitating the handling of vehicle wheels and tires that is simple in construction, efficient in operation, and which is extremely safe to use.

Another object of this invention is to provide a tire and wheel dolly having self-contained apparatus for removing assembled tire and wheels from vehicles, removing the tire from the wheel, and retractable jaws to facilitate the inspection of the tire so removed.

All of the foregoing and still further objects and advantages of this invention will become apparent from a study of the following specification, taken in connection with the accompanying drawing, wherein:

Figure 1 is a side elevational view, partly in section, taken along line 1—1 of Figure 2, showing apparatus made in accordance with the present invention;

Figure 2 is a top plan view of the apparatus shown in Figure 1;

Figure 3 is a fragmentary side elevational view, showing an attachment for use in connection with the present invention;

Figure 4 is an enlarged cross-sectional view taken along line 4—4 of Figure 3;

Figure 5 is a cross-sectional view taken along line 5—5 of Figure 4;

Figure 6 is a top plan view taken on line 6—6 of Figure 5;

Figure 7 is an enlarged cross-sectional view showing the manner in which the tire is removed from a wheel;

Figure 8 is a top plan view showing the manner in which the tire is inspected; and Figure 9 is a side elevational view, partly in section, showing one of the elements of the inspection equipment shown in Figure 8.

Referring now to Figures 1 to 3 of the drawing, apparatus made in accordance with the present invention is shown in operative association with a truck tire 10 that is secured to a wheel which is rotatably supported on an axle 11 and held in a raised position above the ground by means of a jack 12. The dolly, made in accordance with the present invention, includes a portable platform 15 supported at its rear end by a pair of spaced rear wheels 16 and at its front end by means of a single front wheel 17. The dolly is steered in any direction by the manually operated handle 18. It will be recognized that while a manually operated dolly is shown in the drawings, that such may also be provided with a motor for driving the dolly between various work stations, particularly where the larger size wheels and tires are being handled, such as those commonly used in aircraft and heavy trucks.

A large semi-circular clamp 20 is rotatably secured to the platform 15 by an integral transversely extending shaft 22 that engages with spaced bearings 24 located at the rear of the platform. The ends of the clamp 20 are provided with opposed inwardly extending curved plates 21 that may be moved longitudinally relative to each other by means of a handle 23 threadingly engaged with the clamp. The plates 21 may be rotated independently of the handle so as to permit directional adjustment thereof without affecting the adjustment of the clamping members. A pinion 25 is also keyed to the shaft 22 and is in meshing engagement with a rack gear 27 that is mounted for reciprocating longitudinal movement along the platform 15 between a pair of guide blocks 28. The end of the rack gear is connected to the plunger of a hydraulic cylinder by a pressure fluid delivered thereto through a supply line 30 from a fluid supply tank 31. In moving the rack gear from a retracted position, as shown in Figure 1, to an extended position 27a, fluid is admitted to the inlet 32 of the cylinder; in moving the rack gear from the extended position 27a to a retracted position, fluid is admitted to the forward inlet port 33. The control of pressure fluid from the motor pump assembly 35 is maintained by a directional valve 36. An enlarged cutout 26, extending longitudinally of the platform, is provided to accommodate the lower portion of a tire that is rotated therein in a manner hereinafter described. One of a pair of transversely aligned side cylinders 38 is disposed at each side of this cutout 26, each of which is provided with a reciprocating plunger 39 and fluid supply lines 42, 43, for supplying pressure fluid for extending and retracting the plungers, respectively.

In order to facilitate the removal of the tire 10 from the wheel 45, a wheel block 47 having a vertical support column 48 and integral horizontal base 49 is removably supported within the cutout 26. The base 49 extends into a mating slot in the platform 15 immediately beneath the longitudinally acting cylinder 29. The support column 48 is provided with a transverse bore 50 that receives the plungers 39 of the side cylinders 38 when moved to an extended position, all as shown in Figure 4. The upper end of the block 47 is provided with vertically extending studs 51 arranged to be received within the stud receiving openings in conventional wheels 45. A set screw 52, acting between the block 47 and column 48, is provided to permit vertical adjustment of the block from a lowered position to a raised position 47a to facilitate the handling of different sizes of wheels. As is more clearly shown in Figure 8, the outer ends of each of the plungers 39 are provided with transverse bores that removably receive pins 54 for securing claw members 56 thereto for reciprocating longitudinal movement with the plunger, for inspection purposes hereinafter described.

This apparatus may be used to simply remove and replace a tire and wheel assembly or, may also be used to remove the tire from the wheel and for inspection of the tire. To remove the wheel and tire assembly from a vehicle, it is only necessary to move the plates 21 into engagement with the tire after loosening the wheel from its mounting, moving the unit axially away from the axle a short distance to pull the wheel from the axle, and supplying pressure fluid to the supply line 32 to extend the rack gear 27 to effect rotation of the drive pinion 25 and clamp 20 to the position 20a, as shown in Figure 1. If it is also desired to remove the tire from the wheel 45, the wheel is swiveled about its rotatable plate supports 21 into alignment with the clamp 20 prior to effecting rotation of the clamp. Then, pressure fluid may be supplied to the cylinder 29 to rotate the clamp to the position 20a, whereupon the bottom of the clamp and tire extend into the cutout 26 in the platform. The side cylinders are then energized, as shown in Figure 7, whereupon they engage the side walls 40 of the tire to free them from securing engagement with the flanges of the wheel 45. The clamp 20 is then rotated slightly toward its vertical position to permit the wheel to be rotated out of its vertical position 10b to its horizontal position 10a and then to its inclined position 10c, as shown in Figure 3. The wheel block 47 is then secured in position within the cutout 26, whereupon the inclined assembly is returned to the horizontal position 10a and into engagement with the studs 51. Lug nuts are then used to fasten the wheel 45 to the studs 51 of the wheel block and the block is locked in an adjusted position by means of the set screw 52, following which the tire is freed from the flange of the wheel at several points with a pry bar. Pressure fluid is then supplied to the operating cylinder 29 to rotate the clamp from the vertical position 20a towards the inclined position shown in phantom lines in Figure 3 to remove the loosened tire casing 10 from the secured wheel 45. Following this, the wheel 45 and wheel block 47 may be removed from the platform, whereupon the tire may be rotated back to a vertical position 10b and the claws 56 secured to the ends of the side plungers 39. As shown in Figure 8, these claws may be used to spread the side walls 40 of the tire to facilitate the examination of the interior thereof. The flow of pressure fluid to the operating cylinder 29 and side cylinders 38 may be selectively controlled by means of the directional valve 36 that is conveniently disposed so as to facilitate the various movements that are required for the complete and full use of the apparatus. It will be recognized, however, that the apparatus may be used for any one or all of the aforementioned operations.

While this invention has been described with specific reference to the form shown in the drawing, it is to be understood that such is not to be construed as imparting limitations upon the invention, which is best defined by the claims appended hereto.

Having thus described my invention, I claim as new and desire to secure by Letters Patent:

1. A tire and wheel dolly comprising, in combination, a portable platform, a semi-circular clamp mounted on said platform for rotation within a vertical plane, each end of said clamp having a swivelly mounted curved plate for releasably supporting the diametrically opposite sides of a wheel assembly for rotation thereof about the wheel diameter, an adjustable wheel block removably secured to said platform for rigidly supporting the wheel assembly in a horizontal plane independently of said clamp, said clamp comprising an integral transverse shaft rotatably secured to said platform, a pinion fixed to said shaft, a rack gear supported for a reciprocating longitudinal movement on said platform in constant meshing engagement with said pinion, and hydraulic means for selectively moving said rack gear between an extended and a retracted position.

2. A tire and wheel dolly comprising, in combination, a portable platform, a semi-circular clamp mounted on said platform for rotation within a vertical plane, each end of said clamp having a swivel mounting for releasably supporting diametrically opposite sides of a wheel assembly for rotation thereof about the wheel diameter, said clamp comprising an integral transverse shaft rotatably secured to said platform, a pinion fixed to said shaft, a rack gear supported for reciprocating longitudinal movement on said platform in constant meshing engagement with said pinion, and hydraulic means for selectively moving said rack gear between an extended and a retracted position, said platform including an opening for receiving a lower portion of a supported wheel assembly, a reciprocating hydraulic plunger at each side of said opening, said plungers being in axial alignment and adapted to simultaneously engage opposite side walls of a positioned tire, said transverse shaft lying intermediate the end of said platform and said opening, each of said swivel mountings including a curved plate adjustably supported for movement along a common axis relative to each other, said plates being freely rotatable about said common axis, said transverse shaft being supported in spaced bearings secured to said platform, one of said bearings being centrally disposed adjacent to the mid portion of said shaft one at each end thereof, said clamp being secured to said shaft between said central bearing and one end bearing, and said pinion being disposed between said central bearing and the opposite end bearing.

References Cited in the file of this patent
UNITED STATES PATENTS

| 2,332,526 | Pehel | Oct. 26, 1943 |
| 2,444,992 | Kittel | July 13, 1948 |
| 2,546,849 | Branick | Mar. 27, 1951 |
| 2,738,002 | King | Mar. 13, 1956 |
| 2,753,924 | Pearne | July 10, 1956 |